United States Patent
Beach (10) Patent No.: US 8,577,912 B1
(45) Date of Patent: *Nov. 5, 2013

(54) METHOD AND SYSTEM FOR ROBUST HYPERLINKING

(75) Inventor: James E. Beach, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,838

(22) Filed: May 29, 2012

Related U.S. Application Data (63) Continuation of application No. 11/392,995, filed on Mar. 29, 2006, now Pat. No. 8,190,625.

(51) Int. Cl.
*G06F 7/00* (2006.01)

(52) U.S. Cl.
USPC ........... 707/765; 707/752; 707/760; 707/769; 707/776

(58) Field of Classification Search
None
See application file for complete search history.

(56) References Cited

U.S. PATENT DOCUMENTS

| | | | |
|---|---|---|---|
| 5,778,371 A | 7/1998 | Fujihara | |
| 6,643,661 B2 | 11/2003 | Polizzi et al. | |
| 7,181,438 B1 | 2/2007 | Szabo | |
| 2002/0087573 A1* | 7/2002 | Reuning et al. | 707/102 |
| 2002/0103809 A1 | 8/2002 | Starzl et al. | |
| 2003/0084031 A1* | 5/2003 | Tarquini | 707/3 |
| 2003/0182310 A1 | 9/2003 | Charnock et al. | |
| 2003/0196087 A1 | 10/2003 | Stringer et al. | |
| 2004/0111262 A1 | 6/2004 | Maison et al. | |
| 2005/0080797 A1* | 4/2005 | Short | 707/100 |
| 2005/0102308 A1 | 5/2005 | Sykes et al. | |
| 2005/0210049 A1* | 9/2005 | Foster | 707/100 |
| 2006/0248063 A1* | 11/2006 | Gordon | 707/3 |
| 2007/0027839 A1 | 2/2007 | Ives | |
| 2007/0033170 A1 | 2/2007 | Sull et al. | |
| 2007/0050708 A1* | 3/2007 | Gupta et al. | 715/513 |

OTHER PUBLICATIONS

Thomas A. Phelps and Robert Wilensky, Robust Hyperlinks Cost Just Five Words Each, 2000, EECS Department University of California, Berkeley, Technical Report No. UCB/CSD-00-1091, Entire Document.*

Seung-Taek Park, David M. Pennock, C. Lee Giles and Robert Krovetz, Analysis of Lexical Signatures for Improving Information Persistence on the World Wide Web, Oct. 2004, ACM Transactions on Information Systems, vol. 22, No. 4, pp. 540-572.*

Manber, "Finding Similar Files in a Large File System", Department of Computer Science, The University of Arizona, Tucson, Arizona, Oct. 1993 (11pp).*

Manber, "Finding Similar Files in a Larger File System", Department of Computer Science, The University of Arizona, Tucson, Arizona, Oct. 1993 (11pp).

(Continued)

*Primary Examiner* — Mohammad S Rostami
(74) *Attorney, Agent, or Firm* — Novak Druce Connolly Bove + Quigg LLP (57) ABSTRACT

A method includes analyzing a plurality of electronic documents available via a network service, selecting content of the documents encountered during the analysis to generate signatures for the documents based on the content of the documents, generating an index comprising the signatures, and updating the index by performing additional analysis. The index is updated to include documents having the same signatures.

20 Claims, 8 Drawing Sheets

(56) References Cited

OTHER PUBLICATIONS

Egnor, "Project title: Geographic Search", 2002 Google Programming Contest Winner, Available at http://www.google.com/programming-contest/winner.html, 2002 Google (2pp.).

Jazayeri, "Google as a Bookmarking Tool", Submitted to the Department of Electrical Engineering and Computer Science in partial fulfillment of the requirements for the degree of Master of Engineering in Computer Science and Engineering at the Massachusetts Institute of Thenology, May 2004, Ryan Jazayeri, MMIV, (67pp.).

Phelps et al., "Robust Hyperlinks and Locations", *D-Lib Magazine*, vol. 6, No. 7/8, Jul./Aug. 2000, available at http://dlib.org/dlib/july00/wilensky/07wilensky.html, (10pp.).

\* cited by examiner

METHOD AND SYSTEM FOR ROBUST HYPERLINKING

BACKGROUND

Many times when a user attempts to access a web page over a network, such as the Internet, using a web browser, the network returns a message indicating an error that prevents the content of the web page from being displayed. For example, if a web page request is directed to a valid host, but to an invalid Uniform Resource Identifier (URI), the host may return an "error 404: page not found" error message, which may be displayed within an error page. If a web page does not produce a response from the host at the target address, the web browser may display a default message indicating that the requested page cannot be displayed, or may "hang" until the user performs some action.

These and other forms of "page load errors" can occur for various reasons. For example, a URI that is valid at one time may become invalid. In a typical situation, a user may find a web page on the Internet with content to which the user wants to save a link, such as a hyperlink or "bookmark" that includes a reference to the URI of the web page. The publisher of the website hosting the web page may later move either the web page, the entire content of the web page, or portions thereof to another location having a different URI. Furthermore, the content of the web page may also be modified in some way before being incorporated into a new location at the different URI. When the user attempts to access the content using the saved hyperlink, the network may return an "error 404: page not found" error message instead of the web page content. It would be beneficial to provide a method and system for robust hyperlinking that may locate the content of a document, such as a web page, or portions thereof even if such content has been moved or modified.

SUMMARY

One embodiment relates to a method. The method includes analyzing a plurality of electronic documents available via a network service, selecting content of the documents encountered during the analysis to generate signatures for the documents based on the content of the documents, generating an index comprising the signatures, and updating the index by performing additional analyses. The index is updated to include documents having the same signatures.

Another embodiment relates to a method of providing a robust hyperlink. The method includes receiving a request to generate a hyperlink, selecting content of a document, and generating for the document a set of codes based on portions of the selected content. Each code identifies a unique portion of the selected content. The method also includes providing the hyperlink. A portion of the hyperlink includes the set of codes and is configured to facilitate comparison of the set of codes with a plurality of code sets for a plurality of documents in an index.

Another embodiment relates to a method of hyperlinking. The method includes selecting content of a document, and generating for the document a set of codes based on portions of the selected content. Each code identifies a unique portion of the selected content. The method also includes updating an index to include the document and the set of codes. The index includes a plurality of code sets corresponding to a plurality of documents. The index is configured to facilitate comparison of codes in a portion of a hyperlink with the code sets in the index to identify documents in the index that are associated with a number of the codes in the portion of the hyperlink.

Another embodiment relates to a method of providing a robust hyperlink. The method includes receiving a request to generate a hyperlink to content of a document, generating a set of codes corresponding to the document based on portions of the document content so that each code identifies a unique portion of the document content, and providing the hyperlink. A portion of the hyperlink includes the set of codes. The portion of the hyperlink is configured to facilitate comparison of the set of codes with code sets from an index to identify documents in the index that are associated with a number of codes in the set of codes.

Another embodiment relates to a method of hyperlinking. The method includes selecting content of documents and generating for each of the documents a set of codes based on the selected content. Each code identifies a unique portion of the selected content. The method also includes compiling an index. The index includes each set of codes and the corresponding documents. The method also includes receiving a request to generate a hyperlink to content of a particular document, generating a set of codes corresponding to the particular document, and providing the hyperlink. A portion of the hyperlink includes the set of codes corresponding to the particular document. The portion of the hyperlink is configured to facilitate comparison of the set of codes corresponding to the particular document with code sets from the index to identify documents in the index that are associated with a number of codes in the set of codes.

Another embodiment relates to a method of locating document content using hyperlinks. The method includes receiving a set of codes submitted via selection of a portion of a hyperlink containing the set of codes. The set of codes is generated based on portions of content of a particular document so that each code identifies a unique portion of the content of the particular document. The method also includes comparing the set of codes with code sets from an index. The code sets in the index correspond to a plurality of documents. The method also includes identifying documents in the index that are associated with a number of codes in the received set of codes based on the comparison, and providing a list of the identified documents. Each of the identified documents includes the unique portion of content for each of the codes in the received set of codes with which it is associated.

Another embodiment relates to a system for robust hyperlinking. The system includes a content selection engine configured to sample content of documents and a coding engine including computer program logic configured to generate for each of the documents a set of codes based on selected content of the document, wherein each code identifies a unique portion of the selected content. The system also includes a database configured to maintain an index. The index includes each set of codes and the corresponding documents. The system also includes a hyperlink engine including computer program logic configured to receive a request to generate a hyperlink to content of a particular document and provide the hyperlink. A portion of the hyperlink includes a set of codes generated for the particular document. The system also includes a comparison engine including computer program logic configured to compare the set of codes in the portion of the hyperlink with code sets from the index to identify documents in the index that are associated with a number of codes in the set of codes in the portion of the hyperlink.

Another embodiment relates to a method. The method includes performing a web crawl, selecting the content of web pages encountered during the web crawl to generate unique signatures for the web pages based on the content of the web pages, generating an index comprising the unique signatures, and updating the index by performing additional web crawls, the index being updated to include web pages having the same signatures.

DETAILED DESCRIPTION OF EXEMPLARY EMBODIMENTS

Figure 1:
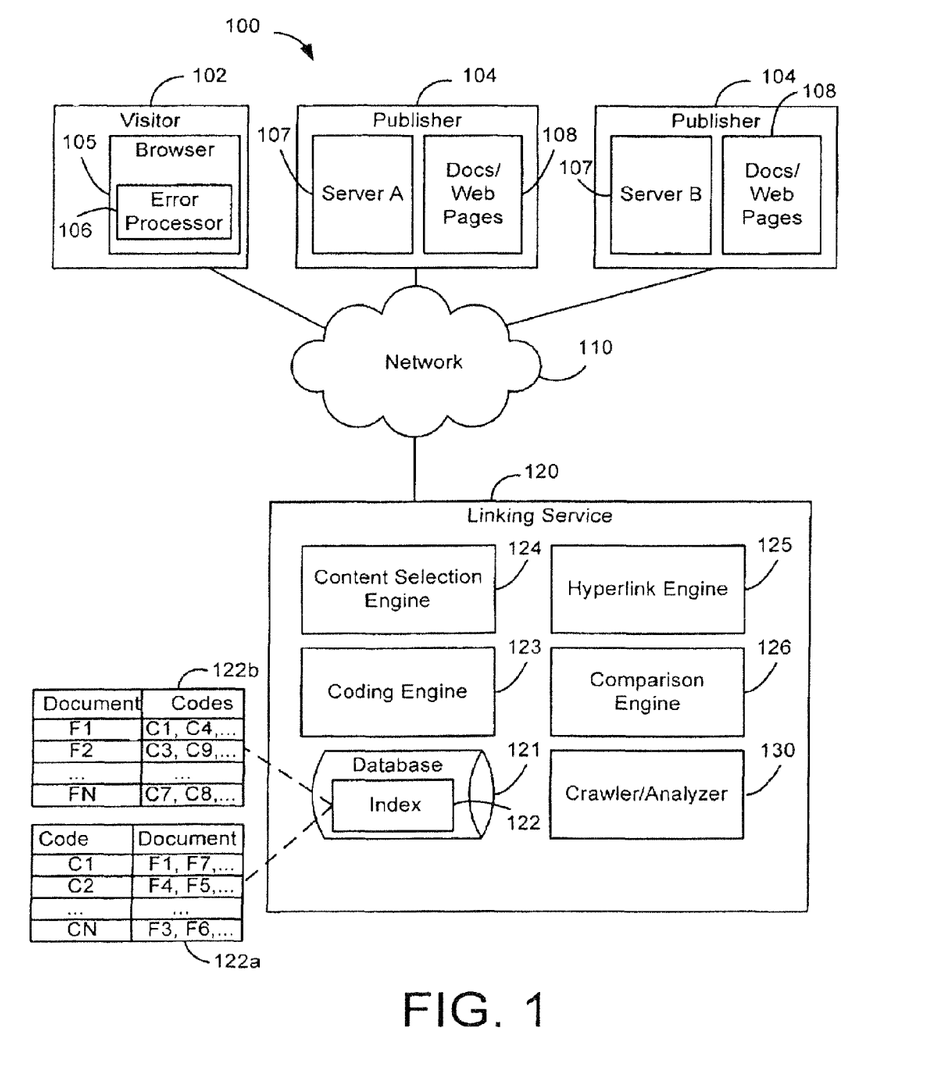
FIG. 1 is a block diagram that schematically illustrates a system for robust hyperlinking according to an exemplary embodiment.

FIG. 1 illustrates a system 100 for robust hyperlinking according to an exemplary embodiment. System 100 may include one or more user computers, such as one or more visitors 102, and one or more publishers 104. Visitors 102 and publishers 104 may each include one or more computers (e.g., a server, personal computer, laptop, workstation, web-enabled phone, web-enabled e-mail device, PDA, etc.) which may be connected to each other by way of a communication network 110, such as the Internet. Visitor 102 may also include a browser 105 and an error processor component 106. System 100 may also include a linking service 120. System 100 is generally configured to allow visitors or other users to view "documents" made available by publishers 104 (e.g., a website including server 107 and associated documents 108 that are generated from a repository of hypertext markup language (HTML) or other content and templates) via communication network 110. A "document," as used herein, is any type of electronic material that contains content. For example, a document may be, but is not limited to, website(s), web page(s), spreadsheet(s), text document(s), etc.

In particular, system 100 is configured to provide robust hyperlinking to content documents so that the content may be retrieved using the hyperlink even if the document or content has been moved and/or modified. For example, a visitor or publisher may find a document with content to which the user wants to create a hyperlink to (e.g., a link embedded in an HTML document, a "bookmark," etc.) in order to facilitate retrieval of the content when desired. According to an exemplary embodiment, system 100 may be configured to generate a set of codes for the document. The set of codes may be "hashes" or other values that are based on portions of the document content. Each code in the set of codes may identify a different portion of the content of the document. System 100 may also be configured to generate a robust hyperlink to the document content, wherein the hyperlink references an identifier (such as a file name or URI) for the document and also the set of codes. System 100 may also be configured to store a plurality of identifiers and corresponding set of codes for a plurality of documents in an index. The index may be periodically updated to provide current identifiers and code sets.

The publisher providing access to the document may move either the document, the entire content of the document, or portions thereof to another location (such as to a new web address or other storage location) having a new identifier after the hyperlink is created. Furthermore, the content of the document may also be modified in some way before being incorporated into a new location. As system 100 may periodically update the index to provide updated identifiers and code sets, these changes may be captured by the index. For example, if the exact document content has been moved to a new location having a new identifier, the index will no longer include the old identifier and corresponding set of codes, but will include the same code set corresponding to the new identifier. If the content of document content has been copied to a new location and/or modified, the index may also include some of the same codes in a code set corresponding to a different identifier. When the user attempts to access the content using the stored robust hyperlink, the set of codes in the robust hyperlink generated for the original document may by compared by system 100 with the code sets in the index to locate the document content or portions thereof, even if such content has been moved and/or modified.

Examples of content that may be located by system 100 may include documents from a different or substitute location. For example, if the document content has been moved or copied to a different location, system 100 may use the set of codes to identify the new location and retrieve the document from the new location. System 100 may also locate cached or archived versions of the requested document using the set of codes in the event that the document content is deleted from its original location. System 100 may also use the set of codes to locate portions of the document content, including portions that are exact copies, or portions that are similar to or related to the requested document content, in the event that portions of the document content are moved and/or modified. According to an exemplary embodiment, system 100 may be tunable as to the degree of match of located content with the requested content. For example, system 100 may be tuned so that only exact matches for the entire content of a document are retrieved, or so that documents including exact portions of a subset of the content or modified versions of the content are returned as well.

Within system 100, browser 105 may operate in conjunction with error processor 106 on a computer or other device of visitor 102. Error processor 106 may be implemented, for example, as a plug-in for browser 105, or may be integrated within the code of browser 105, or may be a stand-alone component that monitors the operation of browser 105 and displays messages external to browser 105. Error processor 106 is generally configured to monitor document requests issued by browser 105 to detect page load errors. The errors detected by error processor 106 may include "error 404: page not found" error messages, timeout errors, errors in which a server indicates that the requested document is no longer available, and other types of page load errors in which a requested document cannot be displayed. Browser 105 and error processor 106 communicate with linking service 120 over communication network 110. According to another exemplary embodiment, error processor 106 may operate in conjunction with, for example, a word processing application that facilitates linking among electronic documents, such as links to recently viewed documents. In this embodiment, error processor 106 monitors document requests issued by the word processing application to detect errors indicating, for example, that the requested document is no longer available or otherwise cannot be displayed.

Figure 5:
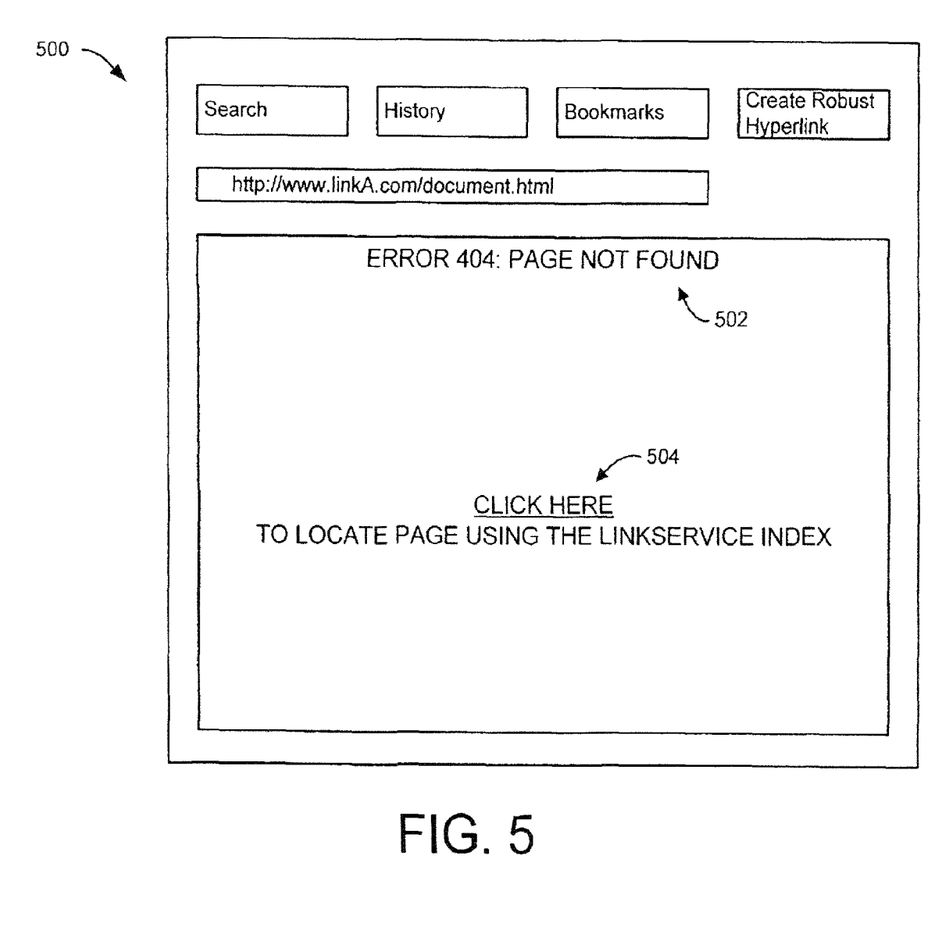
FIG. 5 illustrates a screen in which an error message has been returned according to an exemplary embodiment.

Linking service 120 may include a database 121 configured to provide storage of and access to an index 122. Linking service 120 may also include a coding engine 123, a content selection engine 124, a hyperlink engine 125, a comparison engine 126, and a crawler/analyzer 130. In the illustrated embodiment, linking service 120 is shown as a single entity including each of a database 121, index 122, coding engine 123, content selection engine 124, hyperlink engine 125, comparison engine 126, and crawler/analyzer 130. According to other exemplary embodiments, one or more of these components or the functionality thereof may be provided as separate entities. For example, while coding engine 123, content selection engine 124, and hyperlink engine 125 are shown in FIG. 5 as being embodied within linking service 120, the functionality of these engines or a subset thereof may additionally be embodied in, for example, a computer of user 102 for purposes of generating a robust hyperlink instead of directly accessing this functions from linking service 120. Linking service 120 is generally configured to provide robust hyperlinking to content of, for example, websites, web pages, web page content or portions thereof; or other electronic documents, so that the content may be retrieved using the hyperlink even if such content has been moved or slightly modified. It should also be understood that, while many of the embodiments are described herein in the context of linking to content of web pages over a network such as the Internet, other types of content and systems are contemplated as well. For example, according to an exemplary embodiment, linking service 120 may be configured to link to any type of electronic material. In this embodiment, linking service 120 may be provided as part of an API to enable linking to any type of electronic material over a communication network. According to another exemplary embodiment, linking service 120 may be provided as part of an API to enable local linking electronic documents within a single system.

Database 121 is a database configured to provide storage of and access to index 122. Index 122 is a data structure that includes a current name or other identifier, such as a URI, for one or more documents and a corresponding set of codes for each document. Index 122 may be configured to list the identifiers as a function of each different code in the sets of codes (shown in FIG. 1 as index 122a) or may be inversely configured to list each corresponding set of codes as a function of each identifier (shown in FIG. 1 as index 122b). The set of codes may be a set of hashes or other values generated by coding engine 123 based on portions of the document content so that each code may identify a different portion of the document content, such as a particular unique string of text, characters, etc.

According to an exemplary embodiment, crawler/analyzer 130 is used in conjunction with coding engine 123 to crawl numerous locations over most or all publicly available parts of the entire communication network 110 and analyze numerous documents available via communication network 110 (e.g., web pages available via the Internet). Coding engine 123 may then generate the corresponding set of codes for each document in index 122. As will be described in greater detail below, the identifiers and corresponding set of codes for each document in index 122 may be compared with those generated for a particular document and included in a hyperlink.

Crawler/analyzer 130 and coding engine 123 may also periodically update index 122 by performing additional such crawling operations to maintain a current set of identifiers and code sets to capture changes in the location and content of the documents, as well as additions and deletions of documents. For example, if the exact document content has been moved to a new location, the index will no longer include the old identifier for the location and corresponding set of codes, but will include the same code set corresponding to the new identifier. If the content of a document has been copied to a new location and/or modified, the index may also include some of the same codes in a code set corresponding to a different identifier. In this way, when a user attempts to access the content using the stored robust hyperlink, the set of codes in the robust hyperlink for the original document may by compared with the code sets in the updated index to locate the document content or portions thereof, even if such content has been moved and/or modified.

Coding engine 123 is generally configured to analyze documents 108 available via communications network 110. For example, each document 108 identified by crawler/analyzer 130, coding engine 123 may calculate a set of codes based on the content of the document. Coding engine 123 may also be configured to analyze documents 108 in response to a request from visitor 102 to generate a robust hyperlink to the content of a document 108. Each code may identify a unique portion of the content of the document. The set of codes may be used as a "signature" for the content of the document. According to an exemplary embodiment, the set of codes are determined such that the signature for the content of the document represented by the codes will likely remain similar in the event that the content or portions thereof is moved to a new location, or even slightly modified.

Figure 2:
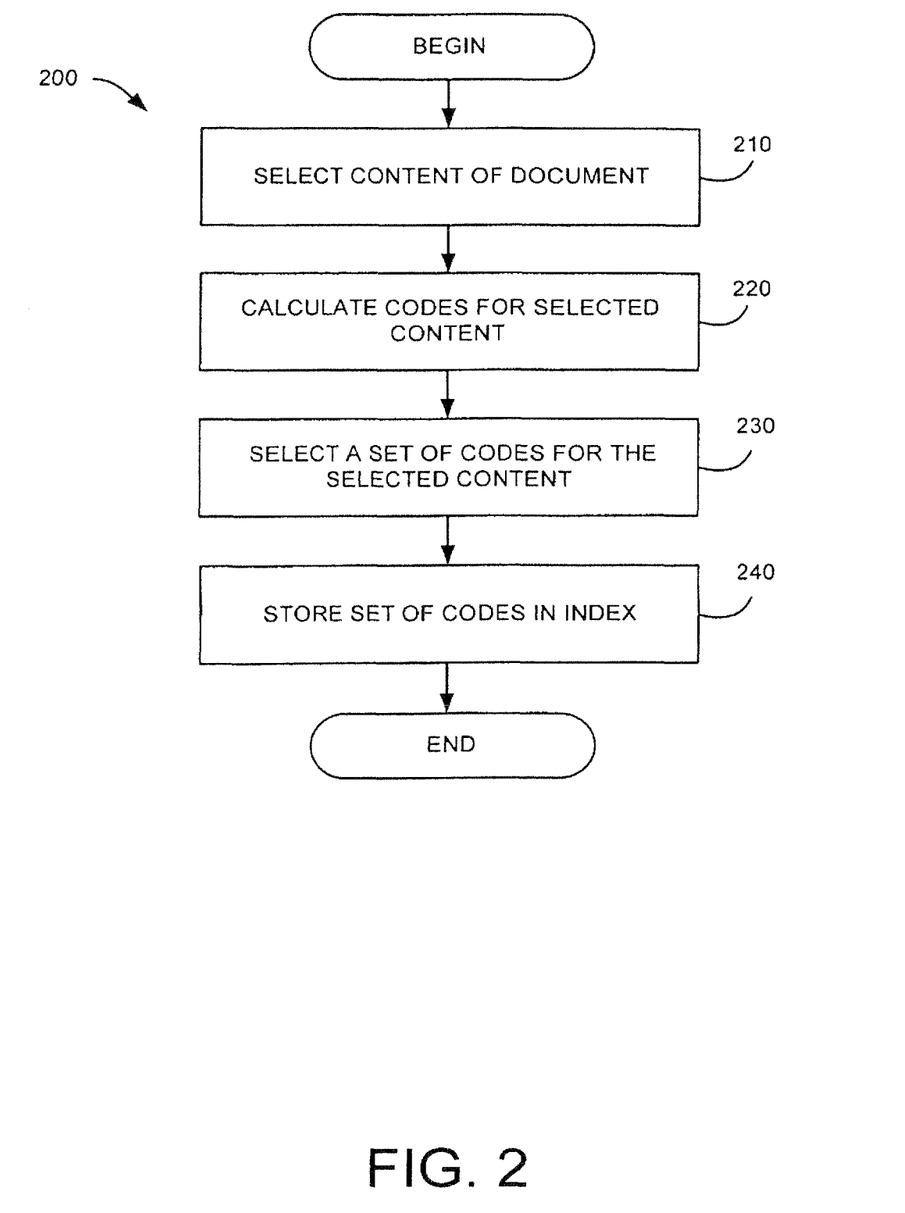
FIG. 2 is a flow diagram illustrating method of generating a set of codes for content of a document using the system of FIG. 1 according to an exemplary embodiment.

FIG. 2 illustrates method 200 of generating a set of codes for content of a document using system 100 according to an exemplary embodiment. Method 200 begins with a step 210. At step 210, the content of a document may be selected using content selection engine 124 (shown in FIG. 1). According to an exemplary embodiment, content selection engine 124 may be configured to select the text content of a document, and may further be configured to normalize the text content, such as by normalizing spaces or other characters and formatting (e.g., reducing multiple consecutive spaces to a single space). Content selection engine 124 may also be configured to remove or otherwise disregard content such as advertisements, images, or other objects in the document structure that may interfere with selecting the text content of the document. While content selection engine 124 is shown as a separate component in FIG. 1, the functionality of content selection engine 124 may be incorporated into coding engine 123 such that coding engine 123 is used to perform step 210.

At a step 220, coding engine 123 calculates a code for each possible substring of a number of characters of the selected content, including overlapping strings of characters, such that each code represents a unique portion of the selected content. Character strings of approximately fifty to one hundred characters may be used according to various exemplary embodiments, although strings of other lengths may be used depending on the desired accuracy. According to an exemplary embodiment, all fifty-character substrings are used including overlaps and each code is calculated as follows. The code for the first fifty-character substring is:

$$F_1 = (t_1 p^{49} + t_2 \cdot p^{48} + \ldots + t_{50}) \bmod M \qquad (1)$$

where p and M are constants, and where $t_i$ are the characters. Equation (1) may be evaluated as:

$$F_1 = (p \cdot ((\ldots (p \cdot (p \cdot t_1 + t_2) + t_3) \ldots )) + t_{50}) \bmod M \qquad (2)$$

The code for the second fifty-character substring is then:

$$F_2 = (p \cdot F_1 + t_{51} - trp^{49}) \bmod M \quad (3)$$

A table of all possible values of $(trp^{49})$ mod M is pre-calculated and used throughout.

At a step 230, a subset of codes from the total number of codes calculated in step 220 may be selected by coding engine 123. According to an exemplary embodiment, approximately one hundred codes are selected for each document. According to another exemplary embodiment, approximately one out of every one hundred codes may be selected based on the content of the underlying string of characters according to a defined scheme.

At a step 240, each set of codes generated by coding engine 123 for a document is stored in and accessed from index 122 in database 121. Index 122 may be updated periodically by coding engine 123 in conjunction with crawler/analyzer 130. According to an exemplary embodiment, index 122 may also be updated with a set of codes for content of a document when specifically requested by visitor 102, such as at the time of generating a hyperlink to the document.

Figure 3:
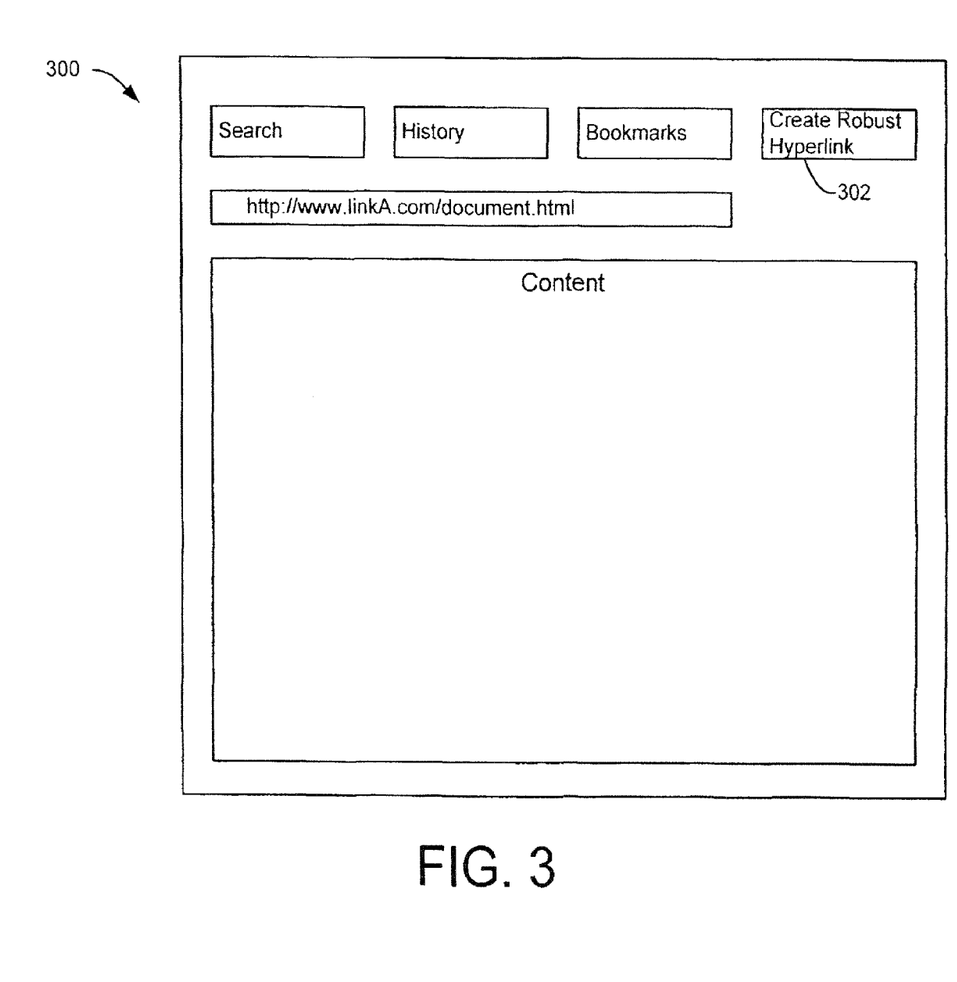
FIG. 3 illustrates a screen that may be used to present a tool bar for creating a robust hyperlink according to an exemplary embodiment.

Referring again to FIG. 1, hyperlink engine 125 is generally configured to receive a request from visitor 102 to generate a hyperlink to content of a particular document 108. The request may be initiated by visitor 102 using, for example, a button on a tool bar of browser 105. For example, FIG. 3 illustrates a browser screen 300 that may be used to present visitor 102 with a tool bar button 302 for creating a robust hyperlink according to an exemplary embodiment. By selecting button 302, a user may request that a robust hyperlink be created to the content of the document currently displayed, which is a web page 108 located at the URI http://www.linkA.com/document.html and stored in Server A (shown in FIG. 1).

Figure 4:
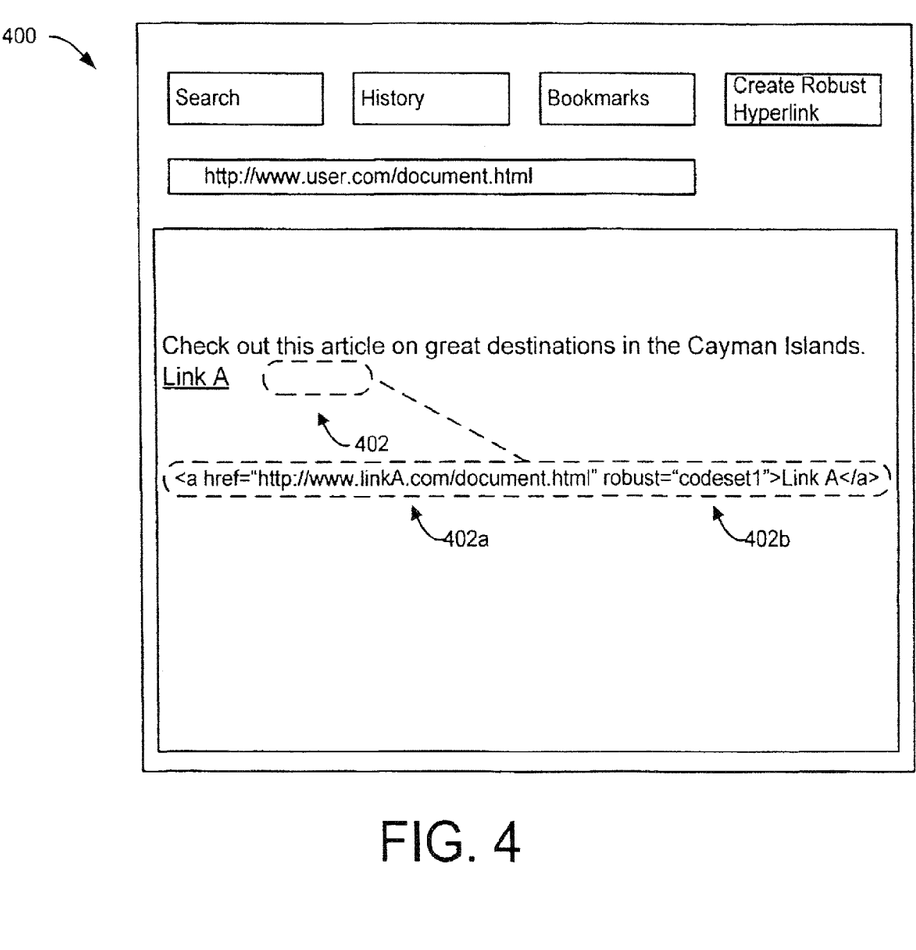
FIG. 4 illustrates a screen in which a robust hyperlink is embedded in the content of a document.

Hyperlink engine 125 is also configured to provide the hyperlink with a portion of the hyperlink including a set of codes corresponding to the particular document. The resulting hyperlink may be stored, for example, as a link embedded in a document (e.g., a web page 108 provided by a publisher 104), or as a bookmark or other object on the computer of visitor 102. For example, FIG. 4 illustrates a web browser screen 400 in which a robust hyperlink 402 entitled "LinkA" is embedded in the content of an HTML document. Selecting robust hyperlink 402 will retrieve the content of the document 108 located at the URI http://www.linkA.com/document.html and stored in Server A.

According to an exemplary embodiment, hyperlink engine 125 may be configured to provide the hyperlink with a portion of the hyperlink including the identifier and another portion including the set of codes from index 122 corresponding to the particular document. For example, robust hyperlink 402 may be implemented as <a href="http://www.link.A.com/document.html" robust="codeset1">Link A</a>. The portion href="http://www.linkA.com/document.html" may represent an identifier portion 402a, and the portion robust=codeset1 may represent a robust portion 402b including the set of codes from index 122. Portions 402a and 402b are shown encircled in broken lines in FIG. 4 to indicate that they represent metadata underlying robust hyperlink 402, and are not actually displayed.

If executing the URI portion of the hyperlink fails to return the requested document content, error processor 106 may provide an "error 404: page not found" error message via browser 105. Visitor 102 may then request that the portion of the hyperlink including the set of codes from index 122 be used by comparison engine 126 to locate the document content. For example, FIG. 5 illustrates a screen 500 in which an "error 404: page not found" error message 502 has been returned by error processor 106 according to an exemplary embodiment. Error message 502 may result if, for example, a visitor 102 clicks on link 402 but the content of the document 108 formerly located at the URI http://www.linkA.com/document.html and stored in Server A has been moved so that it is now located at the URI http://www.linkB.com/document.html and stored in Server B (shown in FIG. 1).

In the event that error message 502 is returned in response to selection of link, web browser 105 and error processor 106 may use the portion of the hyperlink to communicate a set of codes or hashes to linking service 120 when an error event is detected. For example, FIG. 5 shows a link 504 entitled "Click Here" that visitor 102 may select to use the robust portion of the hyperlink to communicate a set of codes or hashes to linking service 120 when an error event is detected. Linking service 120 may respond by using the set of codes in conjunction with an index to locate the document content or portions thereof, including similar or modified portions, as will be described in greater detail below.

Figure 6:
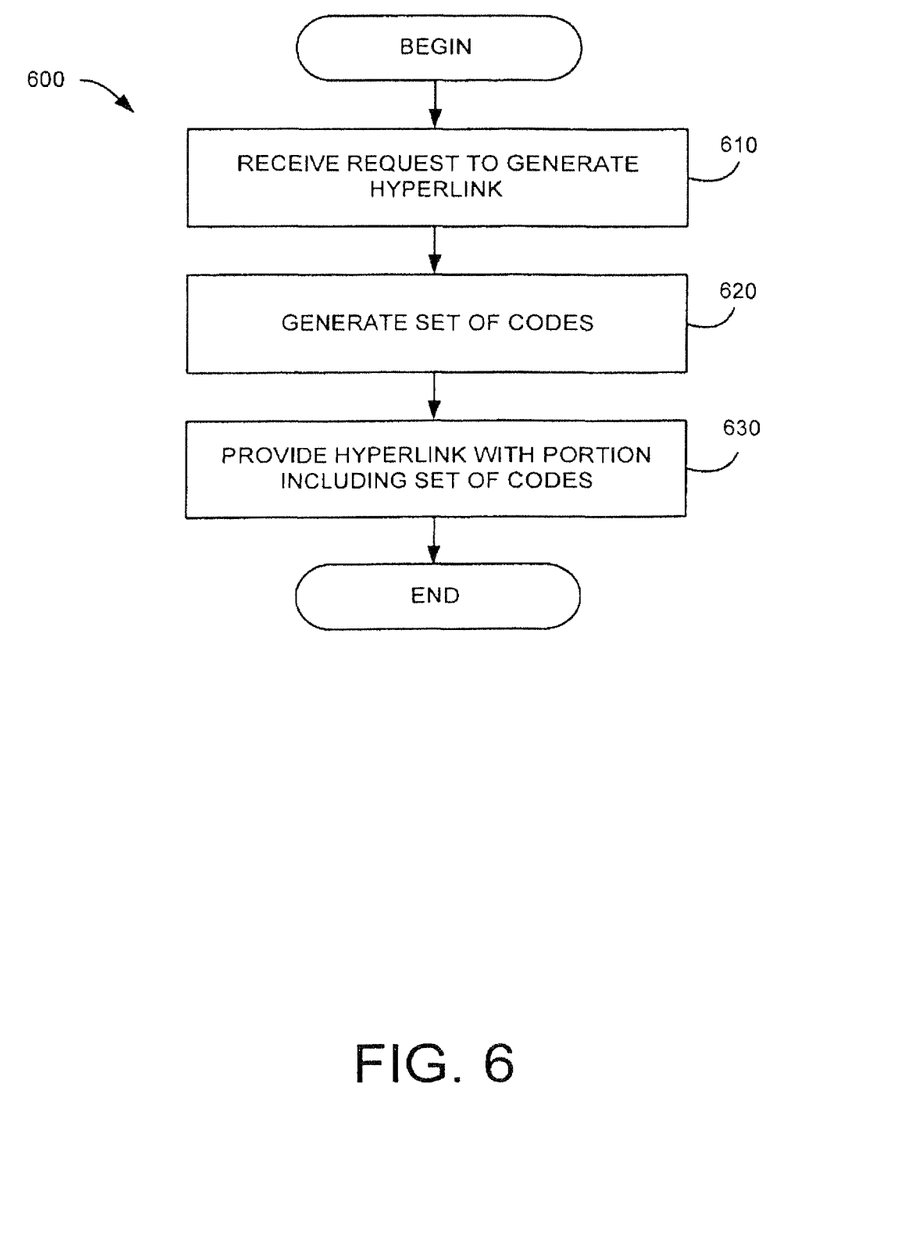
FIG. 6 is a flow diagram illustrating a method of providing a robust hyperlink using the system of FIG. 1 according to an exemplary embodiment.

FIG. 6 illustrates a method 600 of providing a robust hyperlink using system 100 according to an exemplary embodiment. Method 600 begins with a step 610. At step 610, a request to generate a hyperlink to content of a document is received. At a step 620, a set of codes corresponding to the document from index 122 is generated. The set of codes is generated based on portions of the document content so that each code identifies a unique portion of the document content, as described above with reference to FIG. 2. At a step 630, the hyperlink is provided by hyperlink engine 125. A portion of the hyperlink includes the set of codes. The portion of the hyperlink is configured to facilitate comparison of the set of codes with code sets from index 122 to identify documents in the index that are associated with a number of codes in the set of codes. As described above, the functionality of coding engine 123, content selection engine 124, and hyperlink engine 125 or a subset thereof may additionally be embodied in, for example, a computer of user 102 for purposes of generating and providing the robust hyperlink instead of directly accessing the functions from linking service 120.

Referring again to FIG. 1, comparison engine 126 is generally configured to compare the set of codes in the portion of the hyperlink with code sets from index 122 to identify documents in index 122 that are associated with a number of codes in the set of codes in the portion of the hyperlink. Because each code in the set of codes in the hyperlink represents a unique portion of the content of the requested documents, documents in index 122 that are associated with a greater number of codes in the set of codes in the hyperlink are more likely to contain the content of the requested document.

As with the number of characters in each unique portion of content and the number of codes selected for the set of codes in method 200 (shown in FIG. 2), the desired accuracy may be controlled by selecting the number of codes. For example, an exact match for the content (if it exits) is more likely to be the only document identified by comparison engine 126 if all codes in a code set from index 122 are required to match each code in the set of codes in the hyperlink. If a lesser degree of match is desired between the content of the requested page and the content of the identified documents (e.g., for locating documents in which only a portion of the content has been included, or for locating documents that have otherwise modified the content), the number of codes may be lower.

According to an exemplary embodiment, the number of codes may be a percentage of codes in the set of codes in the hyperlink that are required to match in a code set from index 122, and this percentage also serves as an estimate of the minimum amount of content from the requested file that will be contained in files identified by comparison engine 126. According to another exemplary embodiment, the number of codes may be an absolute number of codes in the set of codes in the hyperlink that are required to match in a code set from index 122.

Linking service 120 may also be configured to present the results of the comparison to visitor 102 upon detection of an error event. According to an exemplary embodiment, browser 105 and error processor 106 use the portion of the hyperlink including the set of codes to communicate the set of codes or hashes to linking service 120 when an error event is detected. The set of codes may be communicated to linking service 120 as an automatic response to the error event, or may be communicated to linking service 120 upon selection of the portion of the hyperlink including the set of codes by visitor 102, as described above with reference to FIG. 5. Linking service 120 may respond by using the set of codes in conjunction with an index to locate the document content or portions thereof, including similar or modified portions.

Comparison engine 126 uses the set of codes in the hyperlink in conjunction with index 122 to identify documents including the document content or portions thereof, including similar or modified portions. In the case of a single identified document, browser 105 may then be redirected to the identifier of the located content, or the located content may be retrieved by linking service 120 and sent to browser 105. In the case of multiple identified documents, a message may be displayed to visitor 102 (e.g., via a toolbar or screen of browser 105) with links to one or more documents that include located content.

Figure 7:
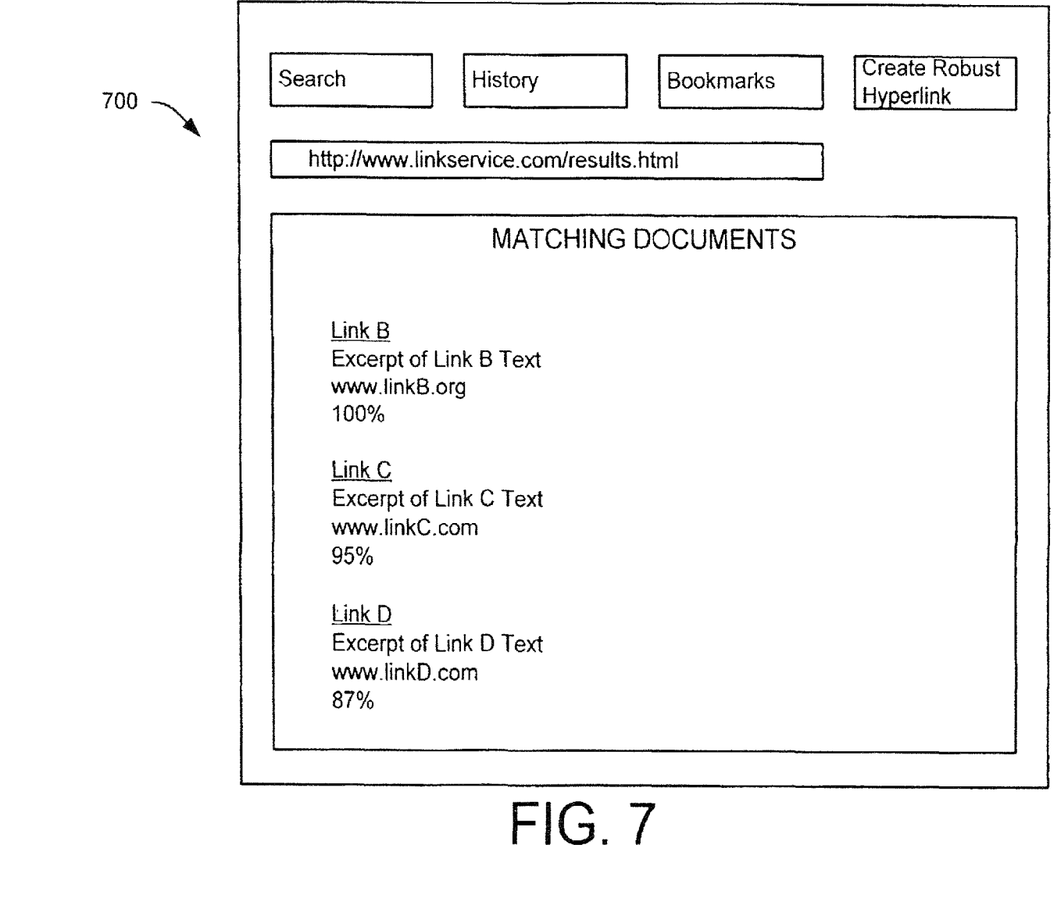
FIG. 7 illustrates a screen that may be used to present links to one or more documents having varying degrees of match to the requested document content according to an exemplary embodiment.

FIG. 7 illustrates a screen 700 that may be used to present visitor 102 with links to one or more documents having varying degrees of match to the requested document content according to an exemplary embodiment. As shown in FIG. 7, the results of the comparison are presented as hyperlinks. Selecting one of the hyperlinks redirects browser 105 to the identifier of the located content. As shown in FIG. 7, the results of the comparison are also ranked in order of the degree of match to the requested document content. For example, Link B exhibits a 100% degree of match according to the comparison performed by comparison engine 126. In this example, Link B may represent the new location of the requested document content, which may have been moved, for example, from a location at Server A to a location at Server B (shown in FIG. 1) after the hyperlink was created. As the exact content of the document was moved from Server A to Server B, crawler/analyzer 130 and coding engine 123 generated a set of codes for the version of the document at Server B that were identical to the codes in the hyperlink. Links B and C may represent documents in which Portions of the requested document content were copied, or even modified.

Figure 8:
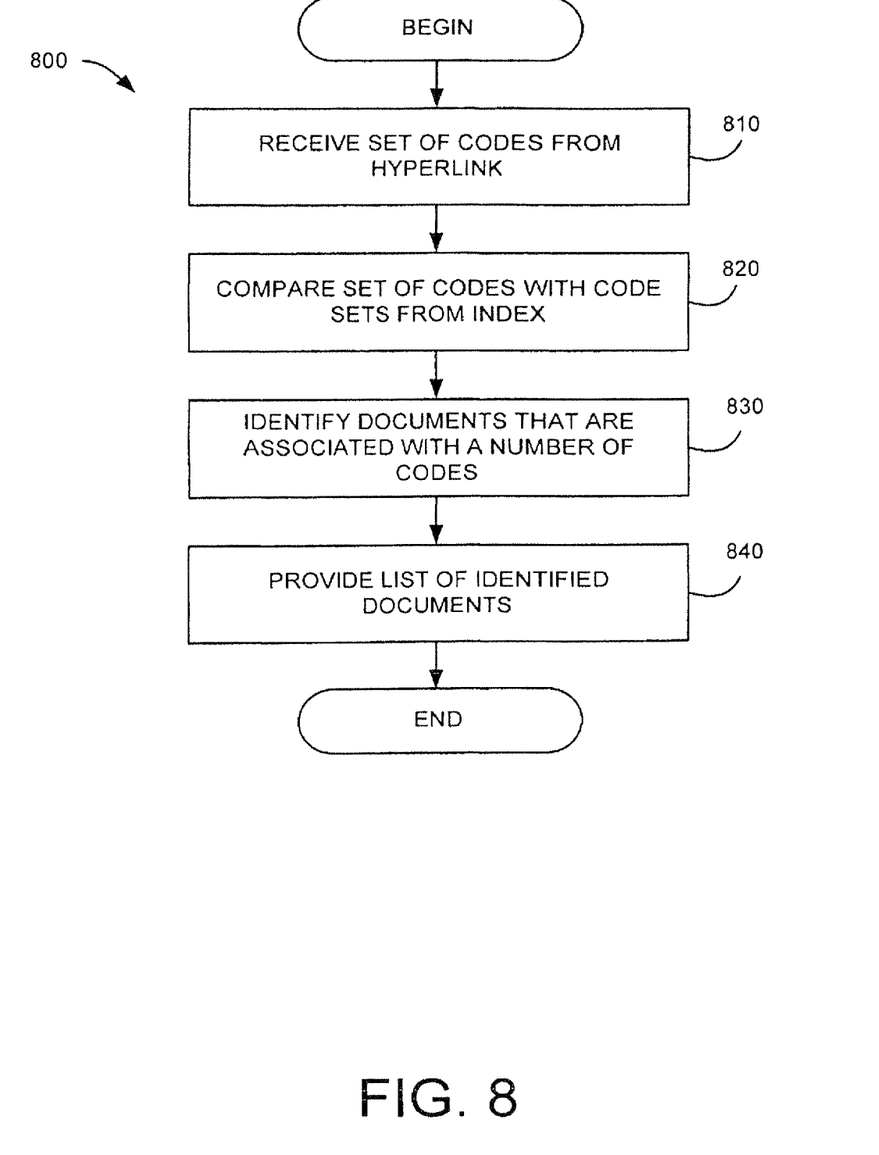
FIG. 8 is a flow diagram illustrating a method of locating document content using the robust hyperlink provided by the system of FIG. 1 according to an exemplary embodiment.

FIG. 8 illustrates a method 800 of locating document content using the robust hyperlink provided by the system 100 according to an exemplary embodiment. Method 800 begins with a step 810. At step 810, a set of codes submitted via selection of a portion of a hyperlink containing the set of codes is received by linking service 120. The set of codes is generated based on portions of content of a particular document so that each code identifies a unique portion of the content of the particular document, as described above with respect to FIG. 2. At a step 820, the set of codes may be compared with code sets from index 122 using comparison engine 126. At a step 830, documents in the index that are associated with a number of codes in the received set of codes may be identified based on the comparison. At a step 840, a list of the identified documents may be provided. Each of the identified documents may include the unique portion of content for each of the codes in the received set of codes with which it is associated.

Here and throughout, terms such as "user," "publisher," "visitor," and so forth are to be understood in the broadest possible sense. Herein, the term "user" is used generically to refer to publishers and visitors. By way of illustration and not of limitation, a "publisher" is not restricted to persons or entities who purport to be in the on-line publishing business (or any other kind of publishing business), nor to entities who have complete or even primary control over the content of particular websites; but rather is used in a more general sense. The term "publisher" includes any person or entity responsible directly or indirectly for putting content on the network (e.g., the Internet), whether by hosting or sponsoring websites, posting pages, frames, graphics, applets, blogs, audio-visual content, etc., on their own or others' websites, providing web services that can source content for websites, or in any other manner. Still further, a "visitor" may be an individual who visits and views or otherwise perceives the content of a web site and pages therein via a web browser or other client software program running on a personal computer, wireless handheld device, or the like, but may also be, for example, a corporate or other entity whose servers access published web content and advertisements by invoking web services through appropriate application programming interfaces (APIs); a "visitor" may or may not be the intended or actual end consumer of a product or service that is the subject of an advertisement, etc. In sum, persons of skill in the art will appreciate that a wide variety of actors, more than can be conveniently set forth here, can play the roles of "publisher" and "visitor" for purposes of the present invention. It will be further appreciated that the same person or entity may be both "publisher" and "visitor." In a similar vein, and as will be apparent from the foregoing, terms such as "web page," "website," and so forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The exemplary embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. For example, other types of web page content, such as HTML structures or images rather than text content may be analyzed and indexed. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method comprising:
under control of one or more computer systems configured with executable instructions,
generating a set of signatures for a plurality of electronic documents by at least in part determining one or more codes each of which represents a unique portion of a selected content from the plurality of electronic documents, wherein the unique portion of the selected content is associated with a particular set of characters different from other sets of characters in the selected content, and wherein each of the one or more codes includes a hash that is generated based on utilizing the unique portion of the selected content as input in order to output the hash, the hash being generated as an identifier for the unique portion of the selected content, wherein each signature in the set of signatures is formed at least in part by a set of hashes;
generating an index that associates the one or more codes for a signature with a document location unique to a corresponding electronic document; and
upon determining that a received document location and a received signature for a requested electronic document is invalid:
identifying two or more electronic documents from the plurality of electronic documents, each of the two or more identified electronic documents having a respective plural number of codes that match at least a subset of a plural number of codes of the received signature; and providing two or more links each specifying a respective location corresponding to a respective one of the two or more identified electronic documents, the respective location being determined according to the index and being different than the received document location, the two or more links being ordered according to a percentage of matching between the respective plural number of codes of each identified document and the plural number of codes of the received signature, the percentage indicating an estimate of an adjustable threshold amount of content associated with the received signature that will be included with each of the two or more links.

2. The computer-implemented method of claim 1, wherein the determining of the one or more codes comprises calculating at least one code for each possible substring of a number of characters of the selected content.

3. The computer-implemented method of claim 1, wherein the requested document is associated with a user-initiated request that includes a selection of a link to a linking service that maintains the index.

4. The computer-implemented method of claim 1, further comprising:

updating the index by including one or more locations for one or more documents determined to have at least one signature matching a subset of the set of signatures.

5. A computer-implemented method comprising:

under control of one or more computer systems configured with executable instructions, selecting content of a first document from a plurality of documents, each document including at least one corresponding location;

generating a first signature for the first document, the first signature including a first plural number of codes, each code representing a unique portion of the selected content, wherein the unique portion is associated with a particular set of characters different from other sets of characters in the selected content, and wherein each code includes a hash that is generated based on utilizing the unique portion of the selected content as input in order to output the hash, the hash being generated as an identifier for the unique portion of the selected content wherein the first signature is formed at least in part by a set of hashes;

receiving a request to access the first document using a first location corresponding to the first document; and upon unsuccessfully accessing the first document using the first location:

identifying two or more locations corresponding to two or more documents from the plurality of documents, each identified location being different than the first location and being associated with a respective plural number of codes that match at least a subset of the first plural number of codes of the first signature; and providing two or more hyperlinks corresponding to the two or more identified locations in an order according to a percentage of matching between the respective plural number of codes associated with each identified location and the first plural number of codes of the first signature, percentage indicating an estimate of an adjustable threshold amount of content associated with the first signature that will be included with each of the two or more hyperlinks.

6. The computer-implemented method of claim 5, further comprising:

providing a hyperlink including the first location corresponding to the first document and the generated first signature.

7. The computer-implemented method of claim 6, wherein the hyperlink is configured to facilitate one or more comparisons of the first signature with a plurality of signatures for a plurality of documents represented in an index, each of the plurality of signatures including a respective plural number of codes, and wherein the index associates the respective plural number of codes of each of the plurality of signatures with respective location of a corresponding document.

8. The computer-implemented method of claim 5, further comprising:

generating a second signature for a different version of the first document, the first document and the different version of the first document having differing content.

9. The computer-implemented method of claim 8, wherein the different version of the first document includes modified content of the first document.

10. The computer-implemented method of claim 5, wherein the selected content includes at least one of text, an image, an audio, or a video.

11. The computer-implemented method of claim 5, wherein the hash is based at least in part on the particular set of characters.

12. The computer-implemented method of claim 5, wherein the first document comprises a web page.

13. The computer-implemented method of claim 5, wherein the first location comprises a uniform resource identifier.

14. A system comprising:

at least one processor; and a memory device including instructions that, when executed by the at least one processor, cause the system to:

select content of a first document from a plurality of documents, each document including at least one corresponding location;

generate a first signature for the first document, the first signature including a first plural number of codes, each code representing a unique portion of the selected content, wherein the unique portion is associated with a particular set of characters different from other sets of characters in the selected content, and wherein each code includes a hash that is generated based on utilizing the unique portion of the selected content as input in order to output the hash, the hash being generated as an identifier for the unique portion of the selected content, wherein the first signature is formed at least in part by a set of hashes;

receive a request to access the first document using a first location corresponding to the first document; and upon unsuccessfully accessing the first document using the first location:

identify two or more locations corresponding to two or more documents from the plurality of documents, each identified location being different than the first location and being associated with a respective plural number of codes that match at least a subset of the first plural number of codes of the first signature; and provide two or more hyperlinks corresponding to the two or more identified locations in an order according to a percentage of matching between the respective plural number of codes associated with each identified location and the first plural number of codes of the first signature, the percentage indicating an estimate of an adjustable threshold amount of content associated with the first signature that will be included with each of the two or more hyperlinks.

15. The system of claim 14, further comprising:
a data store configured to maintain an index that associates the one or more codes with one or more document locations corresponding to the plurality of documents.

16. The system of claim 15, wherein the request to access the first document includes a selection of a link to a linking service that maintains the index.

17. The system of claim 15, wherein web crawling is utilized to update the index to add one or more locations for one or more documents.

18. A non-transitory computer-readable storage medium including instructions for identifying elements, the instructions when executed by a processor of a computing device causing the computing device to:
select content of a first document from a plurality of documents, each document including at least one corresponding location;
generate a first signature for the first document, the first signature including a first plural number of codes, each code representing a unique portion of the selected content, wherein the unique portion is associated with a particular set of characters different from other sets of characters in the selected content, and wherein each code includes a hash that is generated based on utilizing the unique portion of the selected content as input in order to output the hash, the hash being generated as an identifier for the unique portion of the selected content, wherein the first signature is formed at least in part by a set of hashes;
receive a request to access the first document using a first location corresponding to the first document; and
upon unsuccessfully accessing the first document using the first location:
identify two or more locations corresponding to two or more documents from the plurality of documents, each identified location being different than the first location and being associated with a respective plural number of codes that match at least a subset of the first plural number of codes of the first signature; and
provide two or more hyperlinks corresponding to the two or more identified locations in an order according to a percentage of matching between the respective plural number of codes associated with each identified location and the first plural number of codes of the first signature, the percentage indicating an estimate of an adjustable threshold amount of content associated with the first signature that will be included with each of the two or more hyperlinks.

19. The non-transitory computer-readable storage medium of claim 18, wherein the instructions cause the computing device to further provide a hyperlink including the first location corresponding to the first document and the generated first signature.

20. The non-transitory computer-readable storage medium of claim 18, wherein the hyperlink is configured to facilitate one or more comparisons of the first signature with a plurality of signatures for a plurality of documents represented in an index, each of the plurality of signatures including a respective plural number of codes, and wherein the index associates the respective plural number of codes of each of the plurality of signatures with a respective location of a corresponding document.

* * * * *